Jan. 28, 1964  L. OSTERMAIER  3,119,166
KILN FOR CERAMICS

Filed Nov. 16, 1961  2 Sheets-Sheet 1

INVENTOR:
LEO OSTERMAIER
By Toulmin & Toulmin
Attorneys

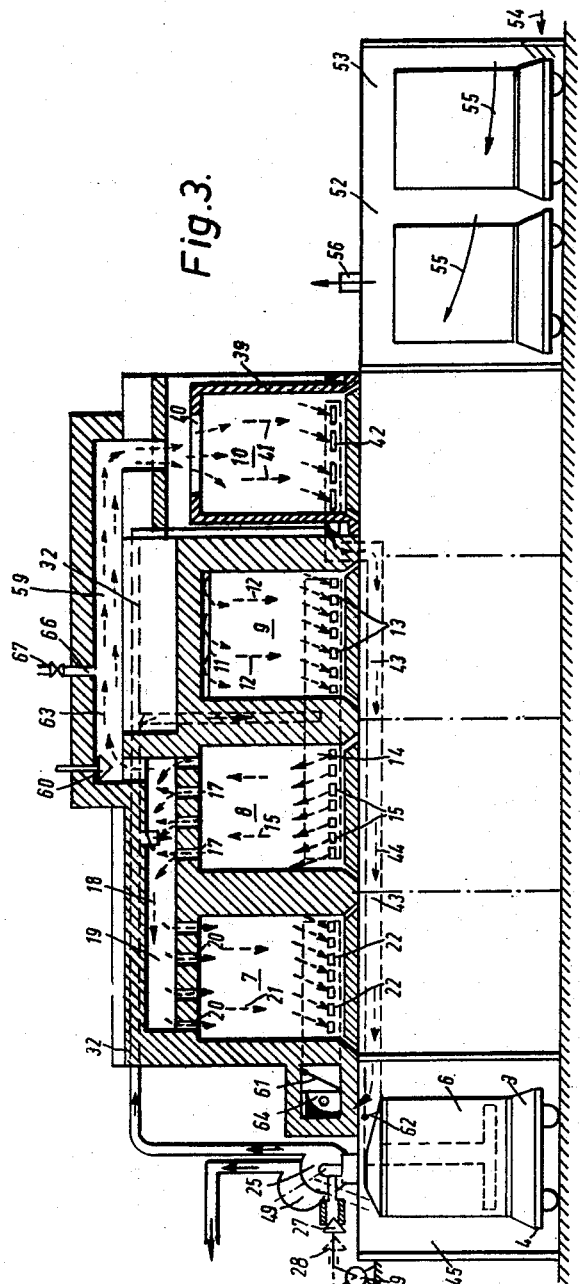

United States Patent Office 3,119,166
Patented Jan. 28, 1964

3,119,166
KILN FOR CERAMICS
Leo Ostermaier, Ehingerstrasse 6, Biberach an der Riss,
Wurttemberg, Germany
Filed Nov. 16, 1961, Ser. No. 152,810
Claims priority, application Germany Aug. 1, 1961
11 Claims. (Cl. 25—135)

The invention relates to kilns and methods of operating the same, especially for firing and cooling ceramic articles such as tiles, hereinafter referred to simply as "the articles" or "the charge."

The invention aims to the construction and operation of the kiln such that the articles are subjected to an additional chemical treatment during the firing or cooling process.

The invention can be applied with advantage to a kiln comprising a heat-insulated tunnel provided with lifting gear for elevating the charge to superjacent chambers. In the respective chambers, the pre-heating, prefiring, firing and cooling steps are performed simultaneously. In this case, it is of importance that the firing or combustion gases in the firing and preheating chamber and the cooling air in the cooling chamber are passed under pressure from the top towards the bottom.

By means of this passage of the combustion gases and cooling air against the natural temperature gradient (because hot air would normally rise), the articles are subjected to a very even temperature treatment. This is because, in contrast with kilns operating under suction, no dead angles and spaces occur within the stack of the articles in these pressure-operated kilns. If, now, chemically active components are added to these combustion or firing gases or if only one chemically active gas is used either alone or in addition to the combustion gases, then the articles, especially tiles, are treated so evenly and rapidly that the kiln can perform the preheating, prefiring, firing and cooling steps in the same operating cycle as hitherto and, in addition, achieve the desired chemical treatment.

Chemical treatment is necessary especially when particulate calcium carbonate is present in the clay when firing tiles. It is known that, if carbon dioxide is added above 550° C., the calcium oxide produced during combustion reverts to calcium carbonate. At this high temperature, there is no extensive expansion of the calcium oxide during conversion to calcium carbonate. If this conversion is not carried out, reversion takes place in the tooled tile. In this case, it gives rise to a substantial alteration in the volume of the calcium oxide and the fired articles, especially tiles, are stressed and damaged, thus making a large proportion of the fired articles useless.

The invention aims to construct and operate the kiln so that treatment of the articles to be fired, especially with carbon dioxide above 550° C., can be carried out easily and cheaply.

According to the invention, there is provided an additional combustion gas passage which can be closed and which leads from the outlet of the prefiring chamber to the inlet of the cooling chamber and from the outlet of the cooling chamber to the flue.

It is important to provide in the cooling chamber at a spacing from the heat insulated outer wall a thin well heat conducting hood which has a large inlet opening for the combustion gases or cooling air at the top and several outlet openings to the combustion gas or cooling air passage at the bottom.

By means of such additional connecting passages and an appropriate construction of the cooling chamber, the cooling step in the cooling chamber can be somewhat retarded so that the freshly fired articles can be treated with flue gases. Subsequent cooling is carried out by means of preheated cooling air and therefore permits the cooling step to be combined with the treatment of the fired articles with flue gas. This so-called recarbonizing does therefore require no additional time and only very little additional construction.

To carry out preheating of the cooling air, it is desirable to provide between the outer wall and the hood cooling air passages which allow the cooling air to escape at the base of the hood so that the cooling air can absorb heat between the hood and the outer wall and to rise to the top to enter the large inlet opening in the hood.

Preferably, the cooling air flowing from the outlet in the cooling chamber is led through a cooling air passage which can be closed and which leads from the outlet of the cooling chamber to an inlet arranged at the bottom of a preheating compartment located in the tunnel in front of the preheating chamber.

The preheating compartment in front of the preheating chamber is required to permit a gradual rise in temperature of the individual chambers.

In order to permit the cooling step to be carried out whilst safeguarding the articles to the greatest possible extent, it is important that the cooling air ventilator or fan or blower be provided with a controllable closure flap.

The fired articles reaching the cooling chamber are left to stand for a short period. During this time, part of their heat is transmitted to the heat conducting hood surrounding them. The suction opening of the cooling air ventilator is now opened to such a small extent that the small quantity of cooling air is strongly preheated at the hood and traverses the articles to be cooled from the top towards the bottom. Upon decreasing temperature of the articles in the cooling chamber, the supply of cooling air is increased by opening the suction opening.

Another ventilator or fan or blower is arranged above the preheating space and there sucks in the air coming from the cooling chamber in order to supply it to a drier.

The tunnel below the chambers thus comprises a preheating compartment in front of the preheating chamber and one or more post-cooling compartments beyond the cooling chamber. These additional compartments also serve to adapt the time-dependent temperature variations in the individual chambers and compartments to the requirements of the fired articles. The tunnel is closed by doors, the outlet door at the post-cooling spaces having controllable air inlet openings.

Another way of influencing the temperature of the combustion gases and cooling air is that the cooling air passages are provided with branch lines and cooling air can be supplied selectively to the combustion gases upon leaving the firing or prefiring chamber.

Conversely, the combustion gases can be made to influence the cooling air insofar that the cooling air passages are installed within the radiating range of the combustion gases and thereby cool, for example, the roof of the chambers, or rather prevent useful heat from escaping to the outside.

An example of the invention is illustrated in the accompanying drawings, wherein:

FIG. 3 illustrates diagrammatically the combustion gas supply during recarbonisation.

Figure 1:
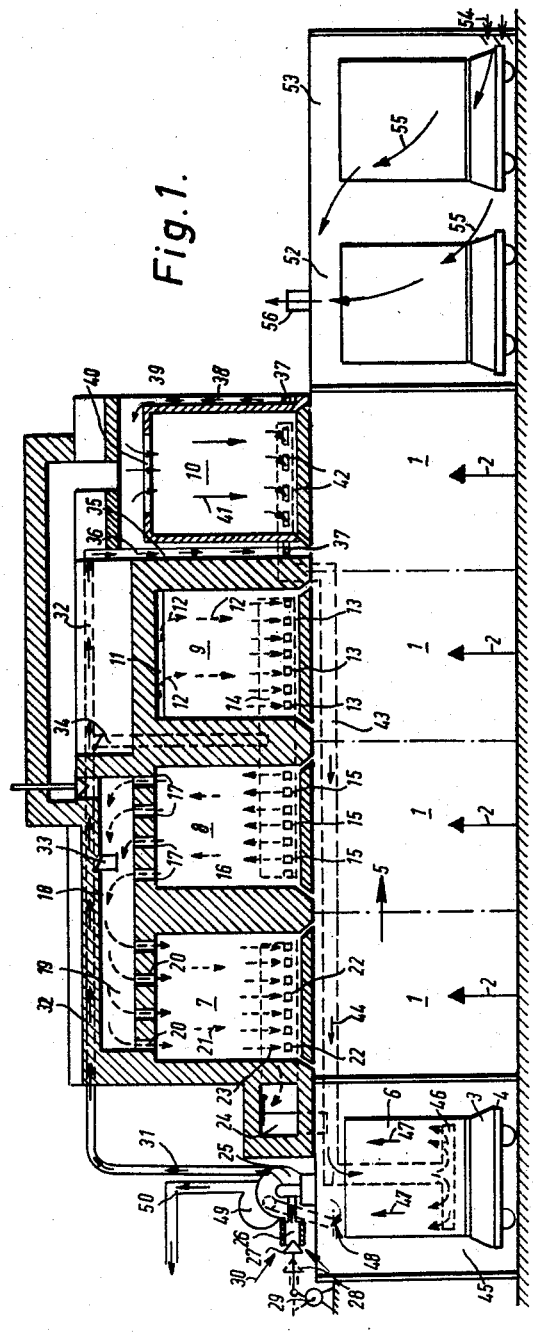
FIG. 1 is a diagram indicating the tunnel with superjacent chambers. The combustion gases and cooling air are here indicated for normal firing.

FIG. 1 shows a tunnel 1 wherein lifting gear (not shown) is located. The lifting gear is effective in the direction of the arrows 2. A car 3 having a surrounding skirt 4 at the bottom can be elevated by the lifting gear in the direction of the arrows 2 to the chambers above the tunnel 1 or, after a completed cycle, it can be lowered to be further conveyed in the direction of the arrow 5 to the next chamber or to the next working cycle. The charge 6 is stacked on the car 3. In the illustrated embodiment, the charge comprises tiles. The chambers comprise a preheating chamber 7, prefiring chamber 8, firing chamber 9 and cooling chamber 10. The combustion or firing gases are guided so that an overflow or deflecting wall 11 in the firing chamber 9 causes the combustion gases to flow under pressure in the direction of the arrows 12 from the top through the charge to the bottom. Outlet openings 13 in the firing chamber guide the combustion gases through the combustion gas passage 14 to the prefiring chamber. There, they flow through the inlet openings 15 and through the prefiring chamber 8 from the bottom to the top in the direction of the arrows 16. The combustion gases then leave the prefiring chamber through the outlet openings 17 and pass in the direction of the arrows 18 in the combustion gas passage 19 to the preheating chamber. There, they enter through the inlet openings 20 to traverse the preheating chamber from the top to the bottom in the direction of the arrows 21. Through the outlet openings 22 in the preheating chamber, the combustion gases finally flow through the combustion gas passage 23 to the flue 24. This flue could, for example, lead to a flue gas drier or to a heat exchanger.

Simultaneously with this guiding of the combustion gases, the fresh air ventilator fan or blower 25 sucks in fresh air through its inlet 26. A controllable closure flap 27 opens the suction opening when it is located in the position 28 shown in broken lines. A servo motor 29 serves to adjust the closure flap. The fresh air arrives in the direction of the arrow 30. The ventilator 25 blows the fresh air in the direction of the arrows 31 through the cooling air passage 32. Branch lines 33, 34 which can be closed permit the addition of cooling air to the combustion gas passages 14, 19 respectively. The cooling air passage 32 is arranged at the top in the roof of the chambers to cool the latter. In the cooling chamber 10, the cooling air is led through cooling air passages 35 in the direction of the arrows 36 to the base of the cooling chamber 10. The cooling air passages have outlet openings 37 at the bottom, from which the cooling air then rises in the direction of the arrows 38. This rising cooling air in the direction of the arrows 38 circulates about the hood 39 which is made from good heat-conducting material. This hood 39 acts as a heat exchanger for the articles reaching the cooling chamber from the firing chamber. The preheated cooling air then reaches the cooling chamber proper through the large inlet opening 40 in the hood 39 and passes through it from the top to the bottom in the direction of the arrows 41. After passing the outlet openings 42 the now heated cooling air reaches the preheating compartment 45 through the cooling air passage 43 in the direction of the arrows 44. In the preheating compartment, it flows through outlet openings 46 to pass through the preheating compartment and the articles located therein from the bottom to the top in the direction of the arrows 47. From an outlet opening 48 in the preheating compartment 45, a ventilator or fan or blower 49 sucks off the still warm cooling air in order to lead it, for example, to a fresh air drier in the direction of the arrow 50.

Figure 2:
FIG. 2 is a temperature-time curve for the individual chambers and the preheating and post-cooling compartments.

By means of a kiln which is constructed as described and carries combustion or firing gases and cooling air accordingly, it is possible, as shown in FIG. 2, to have a substantially uniform temperature curve in the equal time intervals 51. Cooling can be influenced by post-cooling compartments 52, 53. In this case, fresh air is sucked through the controllable inlet 54 to flow through the post-cooling compartments in the direction of the arrows 55 and leave them again through the outlet 56. It is important that, in the preheating compartment 45, the temperature is raised to the so-called dew point 57, i.e. between 150° and 180° C. If this dew point is exceeded, preheating by combustion gases in the preheating chamber 7 can no longer exert a damaging influence on the articles.

It is also important that the fired articles be cooled in the cooling chamber until the so-called crystal point 58 (between 600 and 500° C.) is passed. Subsequent further cooling can no longer damage the fired articles.

In FIG. 3, the same parts are designated by similar numerals. It illustrates the supply of combustion gases during the so-called recarbonization in the cooling chamber, i.e. conversion of the calcium oxide to calcium carbonate.

In addition to the combustion gas passage 19 there is a further combustion gas passage 59. This passage is separated from the passage 19 by a valve 60. If the valve 60 is opened and the closure flap 61 in the flue 24 is closed, further closing of the closure flap 62 forces the combustion gases in the combustion gas passage 19 to a branch line. A portion of the combustion gases flows in the direction of the arrows 63 through the combustion gas passage 59 and through the inlet opening 40 in the hood 39 and flows through the cooling chamber from the top to the bottom in the direction of the arrows 41. Through the outlet openings 42, this portion of the combustion gases then reaches the flue 64 through the cooling air passage 43 in the direction of the arrows 44. The combustion gases passing out of the outlet openings 22 of the preheating chamber 7 are likewise led off through the flue 64.

In FIG. 1, it is indicated that the recarbonization step takes place for only a relatively short time during the cooling step. The portion 65 of the curve shown in broken lines shows that the cooling step is somewhat retarded by the hotter combustion gases. By suitably controlling the controllable closure flap 27, it is possible to allow the cooling step to take place substantially unaltered. From FIG. 3 it can be seen that supply lines 66 with closure valves 67 can be arranged at selected points to introduce chemically active additives to the cooling chamber. It is important to proceed with the entire firing operation in such a way that, in the cooling chamber, either the combustion gas or the cooling air is led against the natural temperature gradient from the top to the bottom to permit rapid switching over of the supply of combustion gas or cooling air in the cooling chamber. This vacuum supply also permits a very even treatment of the charge. With a chemical reaction, this even treatment is decisive for practicability.

What I claim is:

1. Process of recarbonization of formed ceramic articles to convert the calcium oxide thereof into calcium carbonate during the firing of the same in which the gases of combustion are passed across the articles in a firing chamber 9 from the top downwardly while simultaneously and for the same length of time passing said gases across the articles in a prefiring chamber 8 from the bottom upwardly and through a preheating chamber 7 from the top downwardly so that in the preheating chamber the temperature will be maintained between 150 and 180° C. to keep it above the dewpoint, passing the carbon dioxide containing gases of combustion for a short time across the articles in a cooling chamber 10 to retard the cooling while the articles are being recarbonated, and then blowing air across the articles in the cooling chamber to lower their temperature to below 500° C.

2. The process of claim 1, in which the air that is blown across the articles in the cooling chamber traverses the articles in the downward direction.

3. The process of claim 1, in which the air that has been blown across the articles in the cooling chamber is delivered to a preheating compartment 45 ahead of the preheating chamber 7.

4. Apparatus for recarbonization of formed ceramic articles by firing the same to convert the calcium oxide thereof into calcium carbonate comprising means for passing the gases of combustion across the articles first in a firing chamber 9 from the top downwardly, then through a combustion gas passage 14 and through a prefiring chamber 8 from the bottom upwardly, and then through another combustion gas passage 19 and through a preheating chamber 7 from the top downwardly so that in the preheating chamber the temperature will be kept between 150 and 180° C. to keep it above the dewpoint, in combination with means for simultaneously passing gases of combustion which contain carbon dioxide through a cooling chamber 10 to retard cooling during recarbonization while the temperature of the cooling chamber is above 550° C., and means for thereafter blowing cooling air across the articles in the cooling chamber to bring the temperature down to below 500° C.

5. The apparatus of claim 4, in which a valved passageway is provided for conducting hot gases of combustion from the outlet of the prefiring chamber to the inlet of the cooling chamber and from the outlet of the cooling chamber to the smokestack.

6. The apparatus of claim 4, in which the cooling chamber contains a hood of good heat conducting material spaced from a heat insulating outer wall, said hood having an opening in its top for the admission of gases of combustion or cooling air and exit openings along its bottom for the escape thereof, and means for delivering cooling air into the lower portion of the space between the hood and the outer wall for absorbing heat during its upward passage through said space.

7. The apparatus of claim 4, in which a closable cooling air passage extends from the outlet in the cooling chamber to an inlet at the bottom of a preheating compartment 45 located in a tunnel and in front of the preheating chamber 7.

8. The apparatus of claim 4, in which the means for blowing cooling air includes a blower and a closure for controlling its air intake.

9. The apparatus of claim 4, in which there is a controllable branch conduit connecting the means for blowing cooling air with the combustion gas passage 14 between the firing chamber and the preheating chamber.

10. The apparatus of claim 4, in which there is a tunnel under the chambers, said tunnel including a preheating compartment 45 at one end and a post-cooling compartment 52 at the other end.

11. The apparatus of claim 4, in which there is a controllable branch conduit connecting the means for blowing cooling air with the combustion gas passage 19 between the prefiring and the preheating chamber.

References Cited in the file of this patent

UNITED STATES PATENTS

| | | |
|---|---|---|
| 355,387 | Crafts | Jan 4, 1887 |
| 571,599 | Melcher | Nov. 17, 1896 |
| 1,595,817 | Bleininger | Aug. 10, 1926 |
| 1,612,127 | Johnson | Dec. 28, 1926 |
| 1,946,270 | Breaker | Feb. 6, 1934 |
| 1,963,846 | Ipsen et al. | June 19, 1934 |
| 2,982,052 | Lawson | May 2, 1961 |

FOREIGN PATENTS

| | | |
|---|---|---|
| 22,637 | Great Britain | Nov. 25, 1893 |
| 24,426 | Great Britain | Nov. 11, 1904 |